(No Model.) 10 Sheets—Sheet 1.

G. R. WARD.
WRAPPING MACHINE.

No. 545,397. Patented Aug. 27, 1895.

Fig. 1.

WITNESSES

INVENTOR
George R. Ward
by H. Bakewell & Sons
his attorneys (No Model.)  10 Sheets—Sheet 2.

G. R. WARD.
WRAPPING MACHINE.

No. 545,397.  Patented Aug. 27, 1895.

Fig. 2.

WITNESSES  INVENTOR (No Model.)

G. R. WARD.
WRAPPING MACHINE.

No. 545,397.

Patented Aug. 27, 1895.

Fig. 3.

WITNESSES

INVENTOR
George R. Ward
by W. Bakewell & Sons
his Attorneys (No Model.) 10 Sheets—Sheet 4.
G. R. WARD.
WRAPPING MACHINE.

No. 545,397. Patented Aug. 27, 1895.

WITNESSES
INVENTOR (No Model.) 10 Sheets—Sheet 6.

G. R. WARD.
WRAPPING MACHINE.

No. 545,397. Patented Aug. 27, 1895.

WITNESSES

INVENTOR (No Model.) 10 Sheets—Sheet 7.

G. R. WARD.
WRAPPING MACHINE.

No. 545,397. Patented Aug. 27, 1895.

WITNESSES

INVENTOR
George R. Ward
by W. Bakewell & Sons
his attorneys (No Model.) 10 Sheets—Sheet 8.

G. R. WARD.
WRAPPING MACHINE.

No. 545,397. Patented Aug. 27, 1895.

*Fig. 12.*

WITNESSES

INVENTOR

(No Model.)  
10 Sheets—Sheet 9.

G. R. WARD.
WRAPPING MACHINE.

No. 545,397.  Patented Aug. 27, 1895.

WITNESSES  
INVENTOR  
George R. Ward  
by N. Bakewell & Sons  
his Attorneys (No Model.)  
10 Sheets—Sheet 10.

G. R. WARD.
WRAPPING MACHINE.

No. 545,397. Patented Aug. 27, 1895.

WITNESSES

INVENTOR
George R. Ward
by N. Bakewell Sons
his Attorneys

UNITED STATES PATENT OFFICE.

GEORGE R. WARD, OF PITTSBURG, PENNSYLVANIA.

WRAPPING-MACHINE.

SPECIFICATION forming part of Letters Patent No. 545,397, dated August 27, 1895.

Application filed July 27, 1894. Serial No. 518,757. (No model.)

*To all whom it may concern:*

Be it known that I, GEORGE R. WARD, of Pittsburg, in the county of Allegheny and State of Pennsylvania, have invented a new and useful Improvement in Wrapping-Machines, of which the following is a full, clear, and exact description, reference being had to the accompanying drawings, forming part of this specification, in which—

Like symbols of reference indicate like parts in each figure.

My invention relates to machines for supplying wrappers to cubical articles, such as cakes of soap, and is designed to greatly simplify, cheapen, and improve such machines and provide a compact machine having means for cutting, printing, folding, and pasting the wrappers about the articles, which shall be of few parts, easily operated, and occupy a small space.

In the drawings, 2 and 3 represent the rolls of paper for the inside and outside wrappers, respectively, which are wound about shafts 4, held in place by thumb-screws 5. A pinch-brake 6 is provided for regulating the tension upon these shafts, this brake being adjusted by the central adjustable bolt or screw 7. From these rolls the two sheets pass between the cutting-rolls 8 and 9, the roll 8 being covered with felt or similar material and provided with a longitudinal recess having a rubber filling 10, through which projects the longitudinal knife 11. The roll 9 is provided with a similar recess and a projecting rubber filling 10', this filling having a longitudinal groove to receive the splitting-knife 11. The roller 9 is also provided on its surface with fixed type, which print any desired matter on the outer wrapper and contact with the inking-roller 12. The lower wrapper passes over a shaft 13 before reaching the splitting-rollers, and this shaft 13 carries at its ends the toothed wheels 14, intermeshing with pinions 15 upon a shaft 16, which is driven by a suitable pulley 17. The shaft 13 also carries a toothed wheel 18, intermeshing with a similar wheel 19 upon the shaft of the middle roll 9, which actuates the upper and lower rolls 8 and 12.

Figure 1:
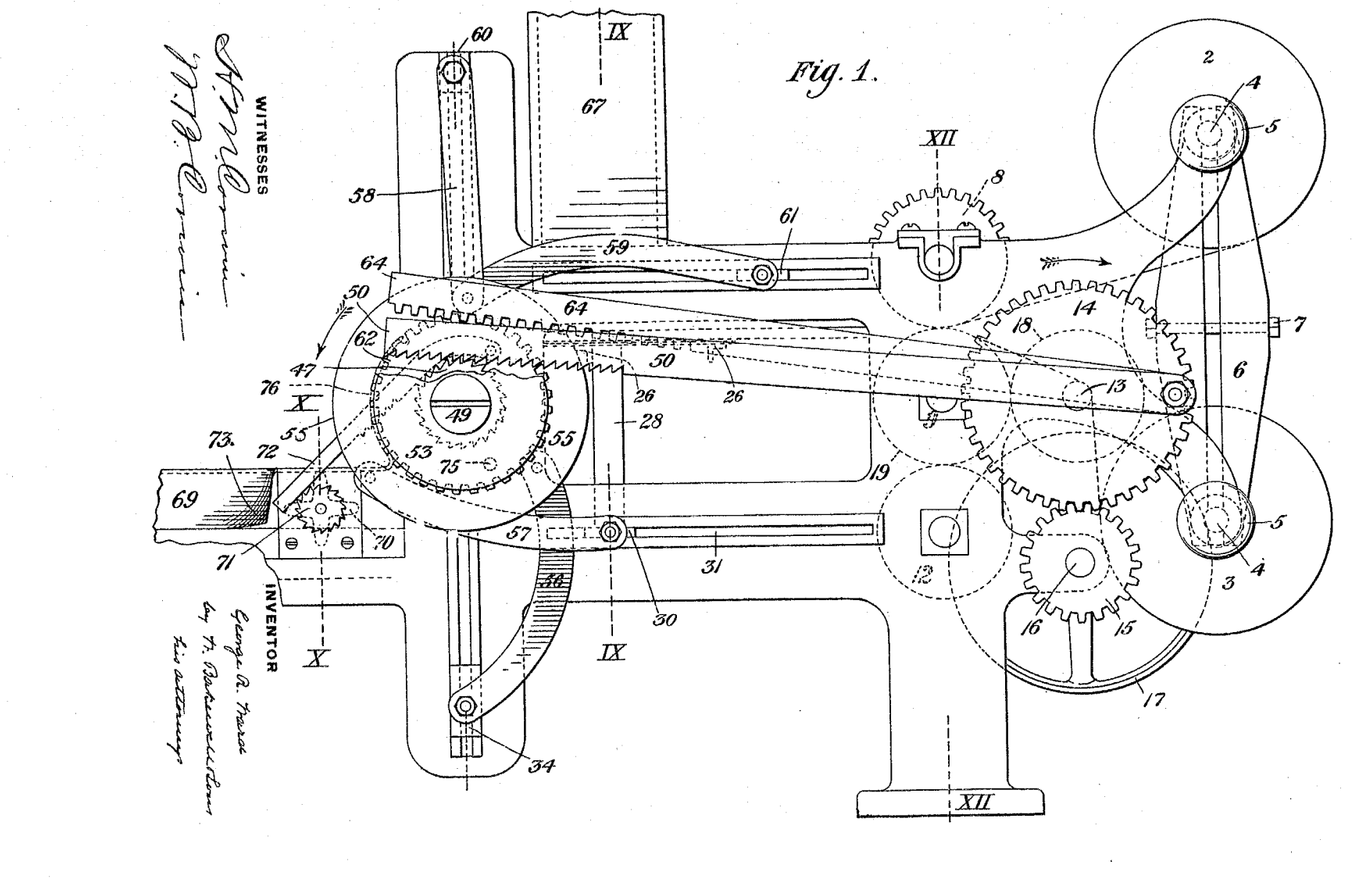
Figure 1 is a side elevation of my improved wrapping and folding machine.
Figure 2:
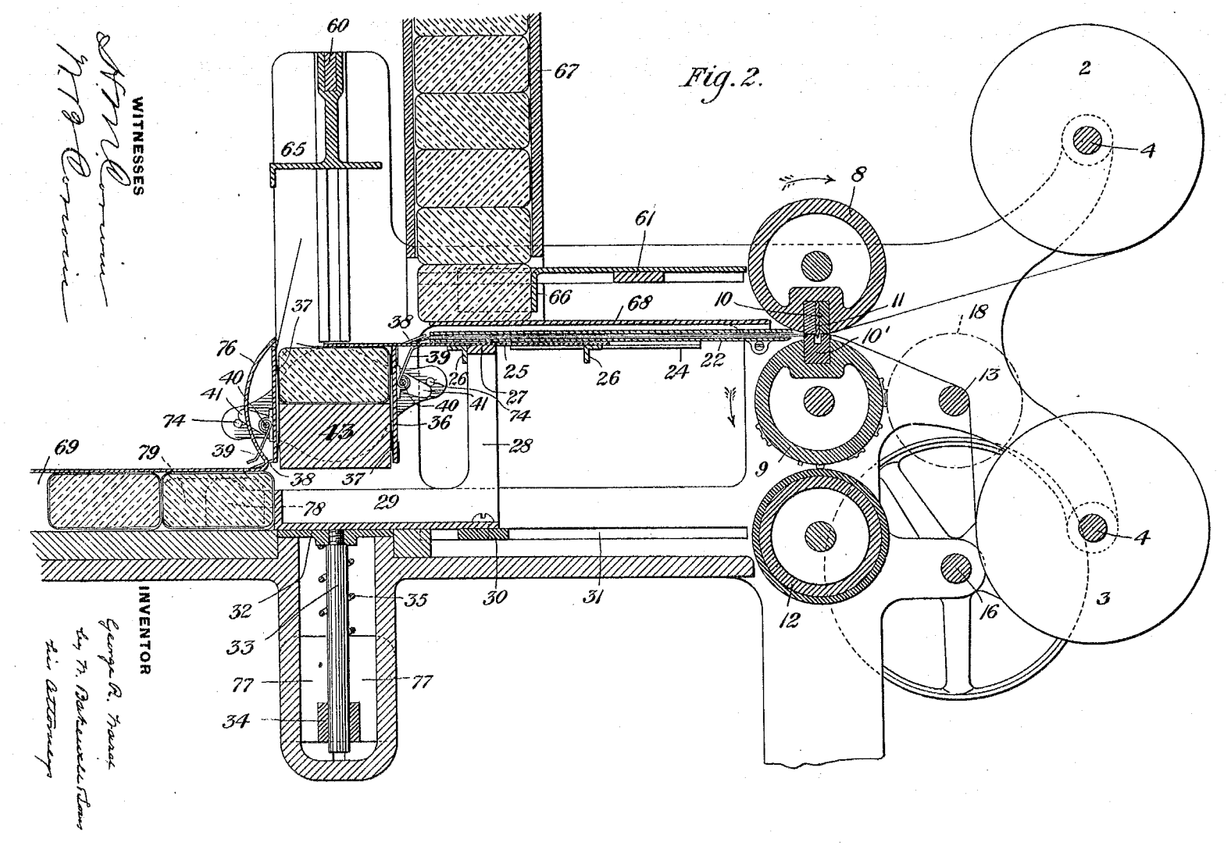
Figs. 2, 3, and 4 are longitudinal vertical sections showing the parts in their successive positions assumed during the operation.
Figures 7, 8:
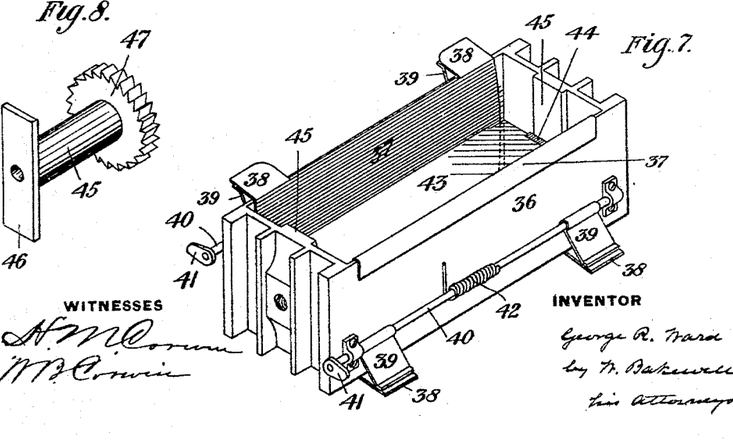
Fig. 7 is a perspective view of the wrapping-box.
Fig. 8 is a detail of the operating-shaft therefor.
Figure 9:
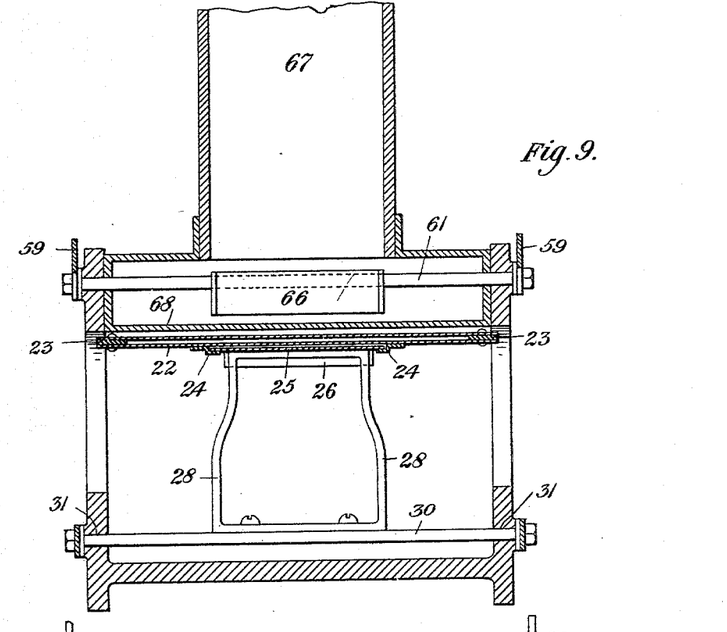
Fig. 9 is a vertical cross-section on the line IX IX of Fig. 1.
Figure 10:
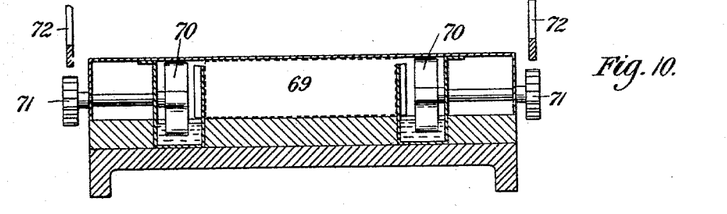
Fig. 10 is a vertical cross-section on the line X X of Fig. 1.
Figure 12:
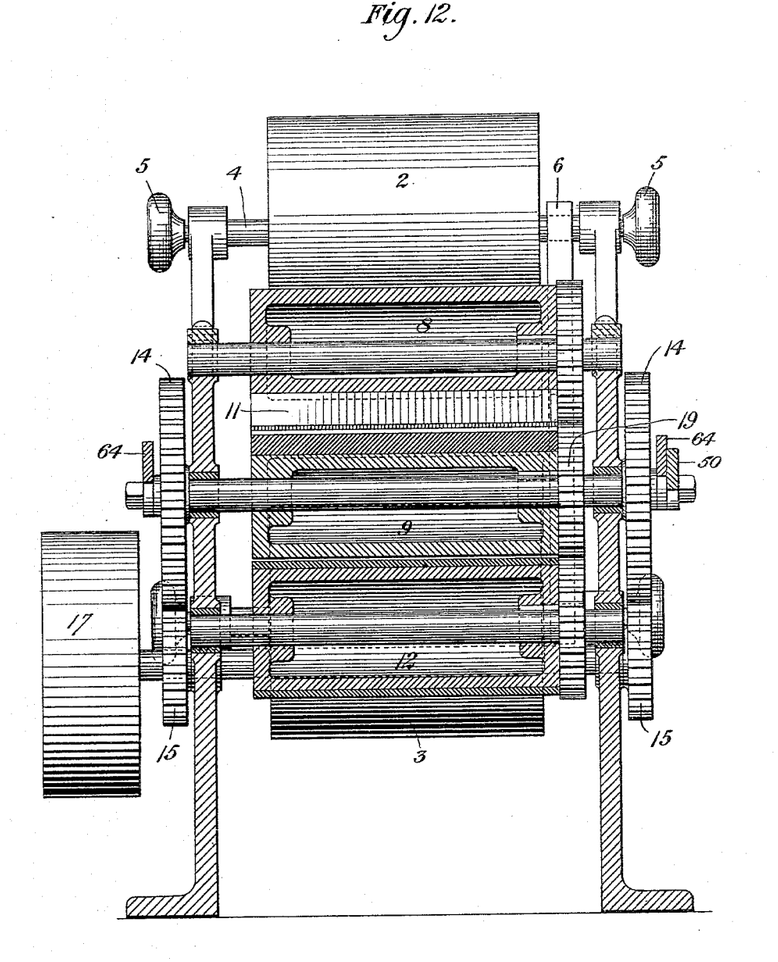
Fig. 12 is a cross-section on the line XII XII of Fig. 1.
Figure 13:
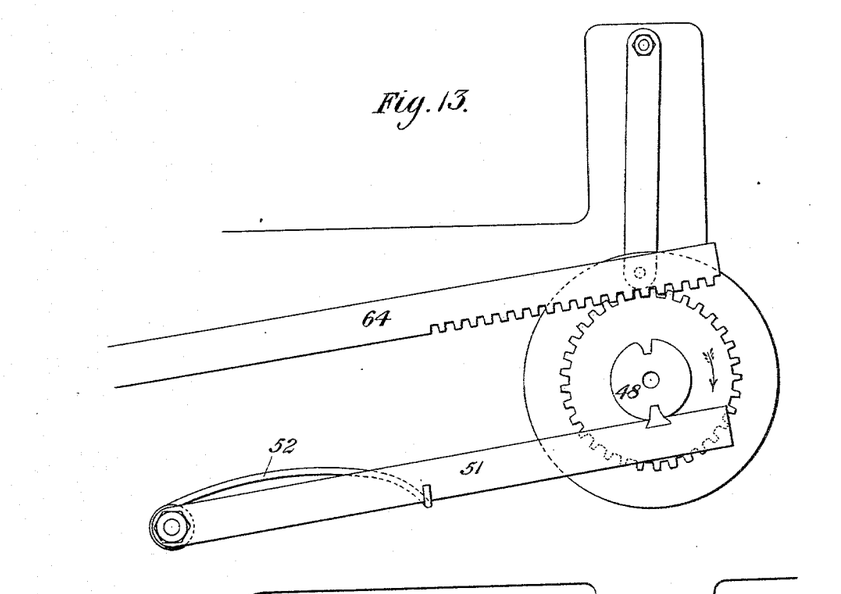
Figs. 13, 14, and 15 are detail views of the locking device for the wrapping-box shown in different positions.
Figures 14, 15:
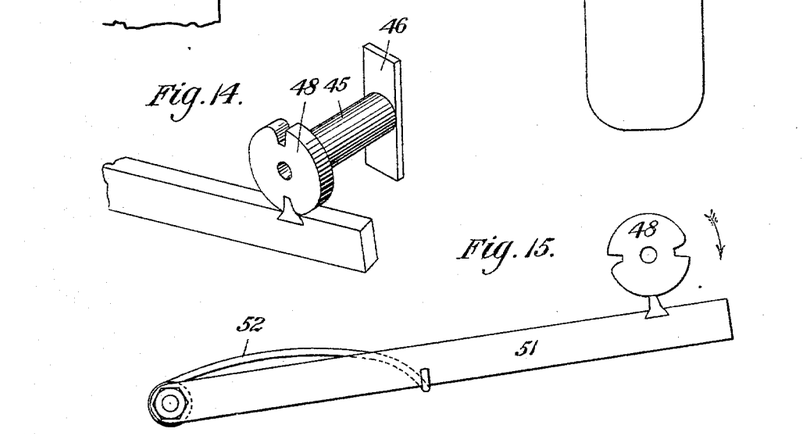
Figures 16, 17, 18, 19, 20, 21, 22, 23:
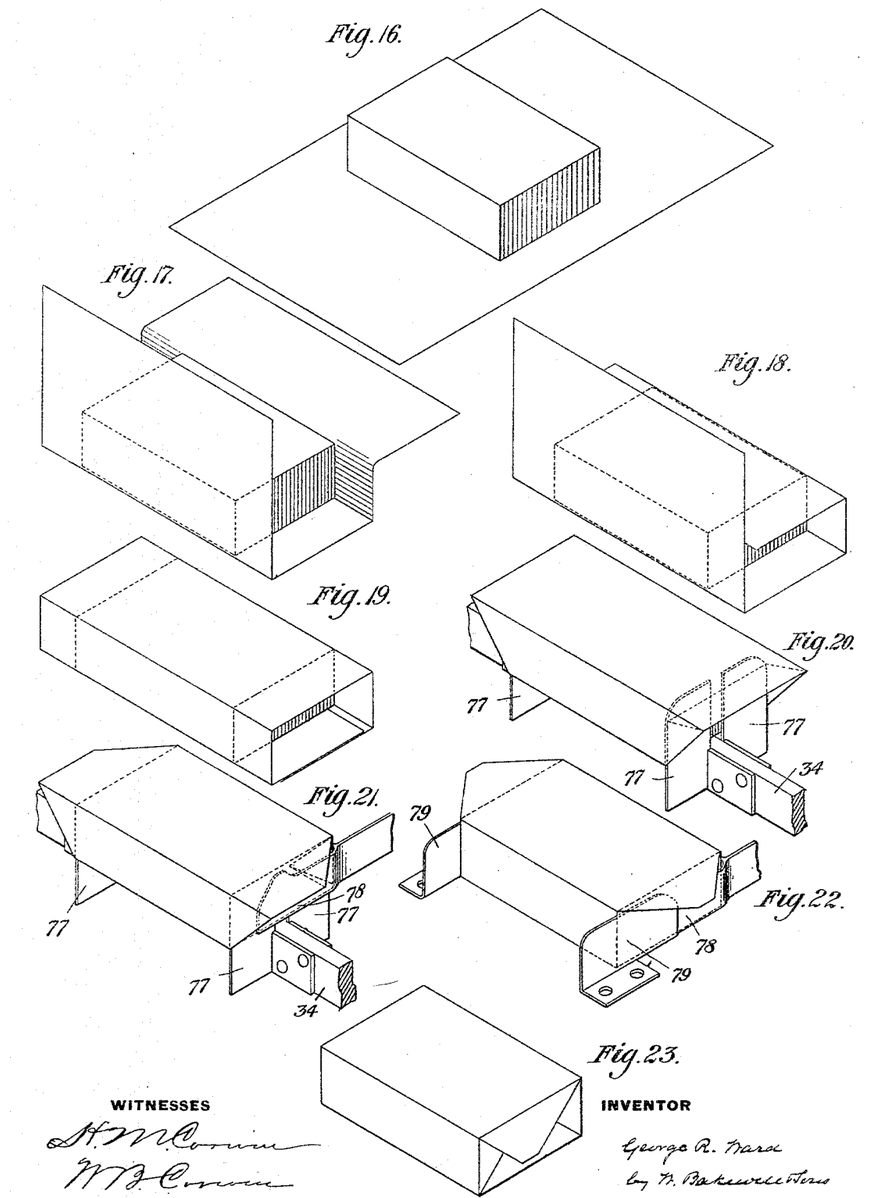
Figs. 16 to 23 are perspective views showing the successive steps of folding.

From the rolls 8 and 9 the wrappers enter a swinging guide-sheath 22, pivoted at its rear end to the frame and composed of two parallel plates held apart by side strips 23. On its under side, as shown in Fig. 9, this table is provided with parallel guides 24, which support a loose plate 25, having upon its bottom the transverse bars 26, between which reciprocates the transverse bar 27, supported upon standards 28. The standards 28 rise from the sides of a movable head 29, carried upon the transverse slide 30, which moves in slots 31 in the framework. Beneath the head 29, when in its forward position, as in Fig. 2, is a table 32, supported upon a stem 33, which moves within a hole in a cross-head 34 and is surrounded by a coiled spring 35. Directly above the table 32 is carried the rotating wrapping-box 36, in which the paper is wrapped about the soap or other material. This wrapping-box, as clearly shown in Fig. 7, consists of a metal box open at the top and bottom and having side lining-pieces 37 of sheet metal, which terminate at the top and bottom, respectively, in lips 38, each lining-piece having two lips, these pairs of lips being located at diagonally-opposite corners of the box and co-operating with plates 39 to form nippers for the ends of the wrappers. The plates 39 are secured to rods 40, pivoted on opposite sides of the box and provided at one end with triggers 41, the plates being normally held in contact with the lips by coiled springs 42. The box is provided with a filling-piece 43, which fits neatly therein and is provided at its ends with leather or other suitable packing-strips 44, which bear upon inwardly-projecting plates 45 upon the ends of the box and create sufficient friction to hold the filling-piece in any position into which it is forced. This box is pivoted at each end upon short hollow shafts 45, the line of the axis of which passes through the box and each having at one end a bar 46, which enters a recess at the end of the box, and one of them having at its outer end a ratchet-wheel 47, while upon the outer end of the other is mounted the locking-wheel 48 of Fig. 12. Through these hollow shafts pass the screw-bolts 49, which are screwed into the ends of the box and draw it firmly against the bars 46. The ratchet-wheel 47, being held thereto by its own weight or by a spring suitably attached thereto, is operated by the rack 50, which is pivoted to the wheel 14 and rests loosely upon the wheel 47, while the locking-wheel is operated by a lever 51, Fig. 13, which is pressed against the edge of the locking-wheel by a spring 52 and is pivoted loosely upon the shaft of the inking-roller. The rack and locking-lever are held in position by the circular guard-plates 53, held upon the outer faces of the ratchet-wheel and locking-wheel, respectively.

Pivoted about the stationary collars 54, which form the bearings for the shafts 45, are disks 55, and pivoted to these disks are the links or connecting-rods 56, 57, 58, and 59, which are pivotally connected with the cross-head 34, the slide 30, an upper cross-head 60, and a horizontal slide 61. The pinions 62 and 63 are secured to these disks, and are operated by the racks 64, actuated by the toothed wheels 14. These racks may be provided with suitable springs or weights to hold them in position. The head 60 carries a pressure-plate 65, which operates to force the soap into the folding-box, while the slide 61 operates an ejector 66, which in its forward movement pushes a cake of soap from the hopper 67 to the folding-box, the series of cakes resting upon a stationary plate 68, over which the ejector moves.

Figure 11:
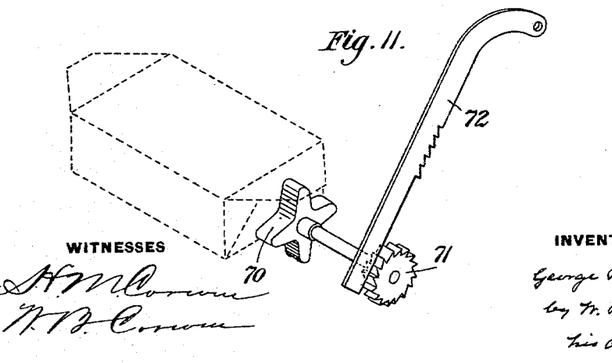
Fig. 11 is a detail view of the pasting mechanism.

From the table 32 the cakes, with wrappers partly folded thereon, pass into the trough 69, which is provided with pasting-wheels 70, one of which is shown in Fig. 11, these wheels having upon their shafts the ratchet-wheels 71, operated by the ratchet-levers 72, pivoted to the disks 55. In front of the pasting-wheels are the folding-ears 73, which make the final fold and force the pasted folds together.

Figure 3:
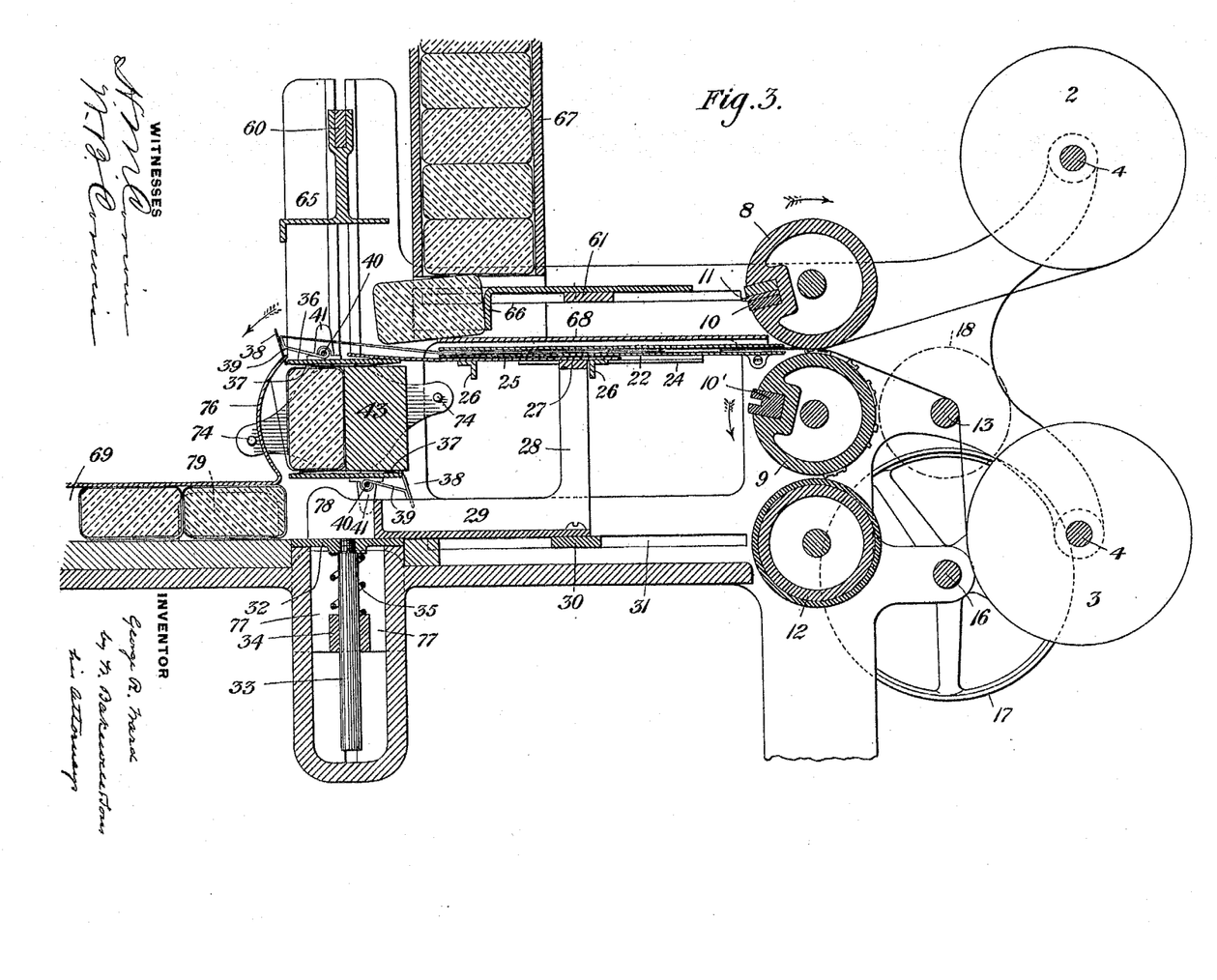
Figure 4:
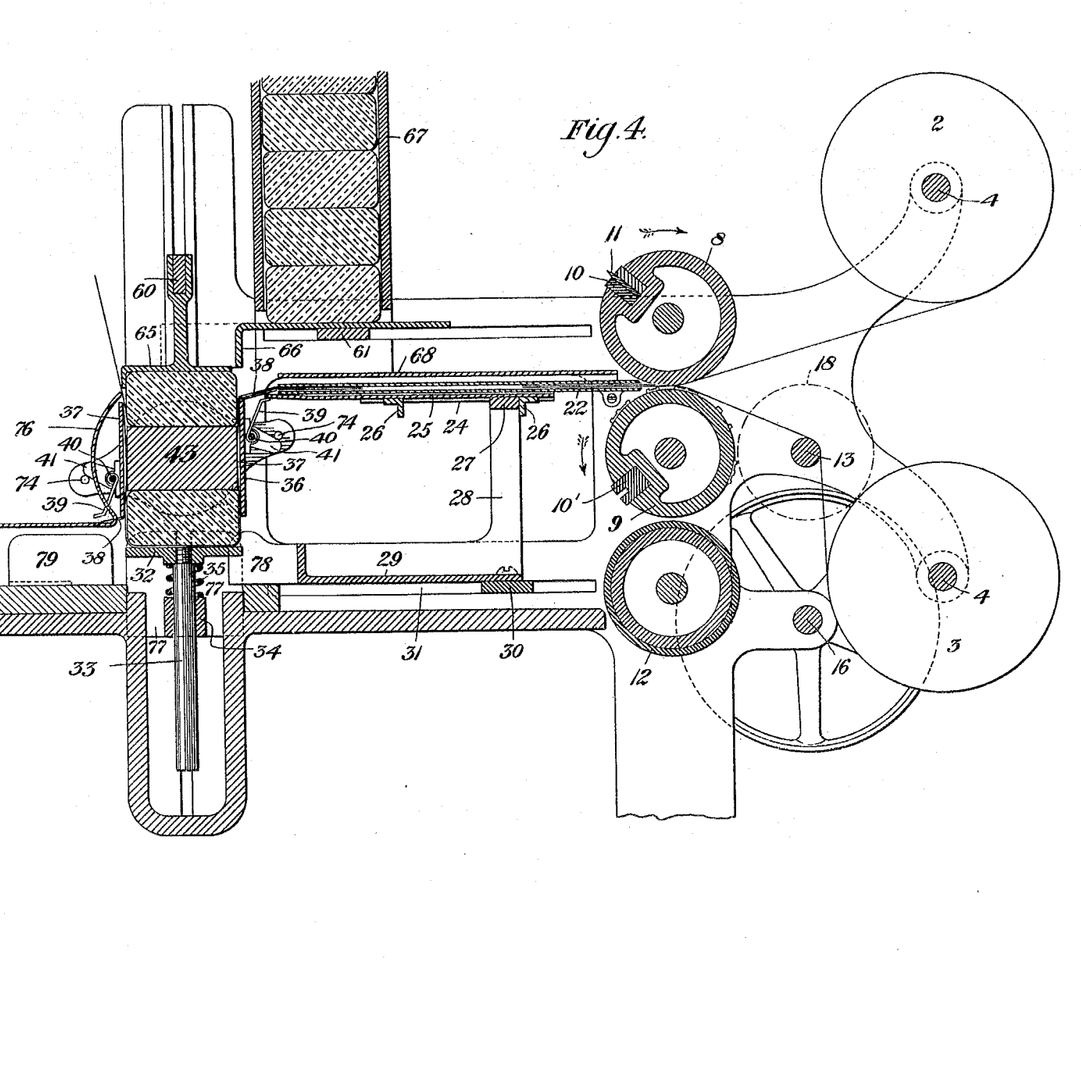
Figure 5:
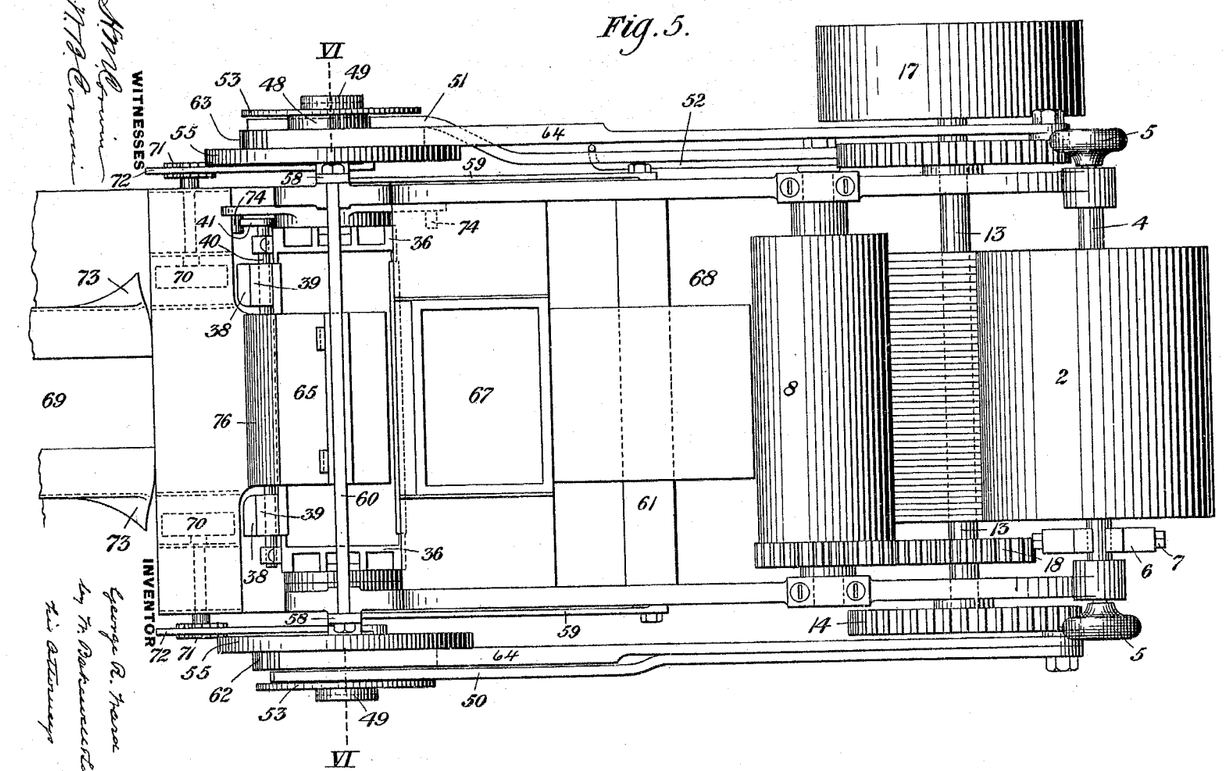
Fig. 5 is a top plan view.
Figure 6:
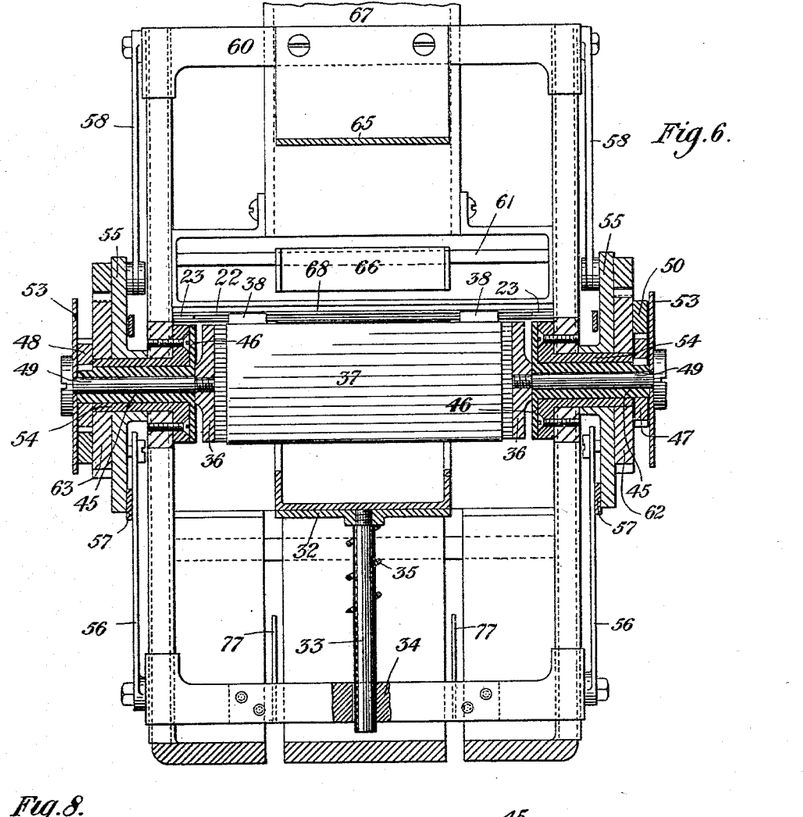
Fig. 6 is a vertical cross-section on the line VI VI of Fig. 5 with parts broken away.

The operation is as follows: Starting with the parts in the position of Fig. 2, the two sheets of paper passing between the rolls 8 and 9 are cut thereby into wrappers after the outer wrapper has been printed upon and the two have been fed through the sheath 22, with their ends projecting from the forward end thereof, as shown. The folding-box at this time is in upright position, and the nippers are held open by the triggers 41 engaging fixed stops 74, and the ends of the wrappers pass between the nippers. As the machine rotates further, both sets of nippers are released, and the upper nippers seizing the wrappers pull them forward into the position of Fig. 3, a cake of soap at the same time being pushed forward by the ejector, while the upper and lower cross-heads 60 and 34 are being moved toward each other and the head 29 is moving rearwardly. As the box continues to revolve to complete a half-turn, the cake of soap is forced from the stationary plate 68 by the ejector 66 and deposited on the moving paper over the plate 25. During this latter part of its movement the paper is drawn from under the soap, keeping it taut and tending to draw the soap forward over the box. The downward movement of the presser 65, with its projecting lip, limits the movement of the soap in this direction, and retains it on the top of the box at the moment the latter comes to rest. In the meantime the head 29 has withdrawn the plate 25, leaving the top of the box free for entrance of the soap. The box having completed a half-turn, the pin 75, bolted into the side of the pinion 62 on the disk 55, is brought against the rack 50, lifting it from the ratchet-wheel 47. The lever 51 now locks the wheel 48, holding the box securely. The paper has been drawn over the shield 76 and the nippers opened by the stops 74, leaving the paper free at its ends. The disks 55 still move, however, drawing the presser 65 downward and driving the soap downward into the box and forcing the filling-block 43 to the opposite side of the box, Fig. 4. When this operation has been accomplished, the presser 65 is retracted and the head 29 moves forward and drives the plate 25 forward. The plate 25 forces the ends of the wrapper from the guide-sheath 22, Fig. 2, over one side of the soap. The next revolution of the box brings the opposite end of the wrapper against the edge of the shield 76 and folds it over the end previously folded by the plate 25. The revolution of the box brings this package and wrapper to an inverted position. As the box revolves, the head 29 is retracted, and as it clears the table 32 the latter is raised upward by the cross-head 34, acting against the spring 35 and driving the table 32 toward the box. The table rises in time to receive the package after having passed from the shield 76. As the box stops and the presser 65 is forced downward, the new cake on top of the box, forcing the filling-block 43 downward, drives the previous cake with wrappers out of the box and with the table 32 downward to the level of the trough 69. On the cross-head 34 is a pair of folding-ears 77, spaced to inclose the ends of the cake. Owing to the relative positions of the links connecting the heads 65 and 34 with the disks 55 while the presser 65 moves downward, driving the lower package before it, the head 34 remains almost stationary. The ends of the package are thus forced against the ears 77, making the end folds of the package.

When this has been completed, the head 29, carrying the folders 78, moves forward, making the first corner folds of the package, the ears 77 in the meantime being withdrawn. When the folders 78 have made their folds, the face of the head 29 abuts against the side of the package and forces it forward into the trough 69. When entering the trough, the forward corners of the package are forced against the folding-blades 79. The package remains in this position while the head 29 retracts. While this head retracts, the toothed lever 72 operates on the ratchet-wheel 71 and turns the pasting-wheel 70 in its reservoir, the arms of the wheel 70 depositing paste against the under side of the projecting folds of the ends of the package. The next operation of the head 29 drives a new package forward and moves the previous one before it, bringing the projecting ears against the wings 73. These fold the ends of the package downward and complete the operation of wrapping the package and pasting the ends of the same. In course of being driven through the trough 69 the folds are bound firmly together and the paste given time to dry.

The wrapping-box is so constructed as to allow a sufficient length of paper between the nippers and the opposite side of the box to make one side and a top fold over the article. The function of the filling-block is to provide a floor for the incoming cake and to support it in the box during the revolution; but this filling-block might be dispensed with, the cake being retained in the box by the friction upon its sides and the nippers being extended to give a sufficient length of paper.

To adjust the machine to different sizes of soaps I may make the various parts adjustable; but I prefer to replace the wrapping-box by another fitted to the different sizes of cakes, thus avoiding a large number of adjustments.

The advantages of the machine will be apparent to those skilled in the art. The parts are few in number, operate in a small space, and perform a variety of functions. The paper is drawn from the reels continuously with a regular motion, thus avoiding any jerking intermittent motion tending to tear it.

The nippers are distant from the rolls only the length of one wrapper, so that the wrapper is fed to the article at the earliest possible moment and only one length of wrapper is projected at a time. The paper is grasped by the nippers as soon as cut, and hence intermediate machinery is avoided. The depositing of the soap upon the paper while the box is turning brings a tension upon the paper and keeps it taut. One cake of soap serves to eject from the box the previous wrapped cake, the moving of one cake displacing the other. The forward motion of the blade below the cake-supporting shelf serves to fold one side of the paper, and being stopped in this position temporarily acts as a floor for the soap to move over, protecting it from abrasion by the turning box. The turning of the box folds one side of the wrapper over the other side and at the same time draws another wrapper or pair of wrappers into position on the top of the box. It will be seen that the box rotates or turns upon itself, whereas in former machines moving carriers have always been used therefor. Each revolution of the machine turns out a package, there being no multiplied movements, one turn of the box giving one revolution of the paper rolls and one oscillatory movement of the disks and heads. As the cross-heads and slides are all operated from the same moving part, their movements are absolutely uniform relatively to each other. The only handling of the soap required is its feeding into the hopper, it being turned out with a perfectly folded, pasted, and printed wrapper or wrappers thereon.

I claim as my invention—

1. The method of wrapping consisting in forcing a wrapper and article into a bottomless box, rotating the same a partial revolution, and forcing a second wrapper and article into the box, thereby ejecting the first; substantially as described.

2. The method of wrapping, consisting in forcing a wrapper and article into a bottomless box, rotating the same a partial revolution, and simultaneously bringing a second wrapper and article over the bottom of the box and then forcing the same thereinto thereby ejecting the first; substantially as described.

3. The combination with a bottomless wrapping box, of means for rotating the same upon itself, and means for forcing the article and wrapper thereinto and ejecting it therefrom; substantially as described.

4. The combination with a bottomless wrapping-box and means rotating the same upon an axis intermediate of its length, of nippers located thereon and arranged to pull forward the wrapper; substantially as described.

5. The combination with a bottomless rotatory wrapping-box, of means for forcing the article and wrapper thereinto, means for rotating the box upon an intermediate axis, and nippers thereon arranged to pull forward the wrapper; substantially as described.

6. The combination with a bottomless rotatory wrapping-box and means for rotating the same about an intermediate axis, of nippers located thereon and arranged to pull forward the wrapper, and means for opening the nippers and closing them upon the wrapper; substantially as described.

7. The combination with a bottomless rotatory wrapping-box, of means for rotating the same about an intermediate axis and a shield arranged to fold the wrapper as the box turns; substantially as described.

8. The combination with a bottomless rotatory wrapping-box, of means for rotating the same about an intermediate axis, means for forcing the article and wrapper thereinto and ejecting it therefrom, and a movable table arranged to receive the same when forced from the box; substantially as described.

9. The combination with a bottomless rotatory wrapping-box, of means for rotating the same about an intermediate axis, means for laying the wrapper and article upon its open top, and means for forcing the same thereinto and ejecting it therefrom; substantially as described.

10. The combination with a bottomless box, of means for rotating it upon an intermediate axis, and mechanism for forcing a wrapper and article thereinto, said mechanism being arranged to operate each partial revolution of the box, whereby the first article is ejected by the second.

11. The combination with a bottomless rotatory wrapping-box, of means for forcing a wrapper and article part way therethrough, means for rotating the box, and nippers upon the box arranged to pull a second wrapper into place in its rotation; substantially as described.

12. The combination with a bottomless rotatory box, of means for rotating the same about an intermediate axis, a movable head arranged to force the wrapper and article thereinto, and a movable table arranged to receive the same when ejected therefrom; substantially as described.

13. The combination with a bottomless rotatory box, of means for rotating the same upon an intermediate axis, means for feeding the wrapper and article thereto, a movable head arranged to force the wrapper and article thereinto, and a movable table arranged to receive the same when ejected therefrom; substantially as described.

14. The combination with a bottomless rotatory box, of a movable head arranged to force the wrapper and article thereinto, a movable table arranged to receive the same when ejected therefrom, and a sliding cross-head arranged to raise the table; substantially as described.

15. The combination with a bottomless rotatory box, of a movable head arranged to force the wrapper and article thereinto, means for rotating the box intermittently upon an intermediate axis, and a movable table arranged to receive the same when ejected therefrom; substantially as described.

16. The combination with a bottomless rotatory box, of a movable head arranged to force the wrapper and article thereinto, a movable table arranged to receive the same when ejected therefrom, and a slide arranged to push the wrapped article from the table; substantially as described.

17. The combination with a bottomless rotatory box, of a slide arranged to feed the article thereto, a movable head arranged to force the wrapper and article thereinto, means for rotating the box intermittently upon an intermediate axis, and a movable table arranged to receive the wrapped article; substantially as described.

18. The combination with the feeding and cutting mechanism, of a sheath through which the wrapper is forced, and a wrapping box rotatory upon an intermediate axis and having nippers arranged to pull the wrapper into place; substantially as described.

19. The combination with the feeding and cutting mechanism, of a sheath through which the wrapper is forced, means for depositing the article upon the wrapper, and a rotatory wrapping-box pivoted upon an intermediate axis and having nippers arranged to pull the wrapper into place; substantially as described.

20. The combination with the feeding and cutting rolls, of a sheath through which the wrapper is forced, means for depositing the article upon the wrapper, a rotatory bottomless wrapping-box into which the article and wrapper are forced, and means for rotating the box intermittently upon an intermediate axis; substantially as described.

21. The combination with a bottomless rotatory box, of a movable head arranged to force the wrapper and article thereinto, a movable table arranged to receive the same when ejected therefrom, and folding flanges arranged to act upon the wrapper as the table is lowered; substantially as described.

22. The combination with a bottomless rotatory box, of a movable head arranged to force the wrapper and article thereinto, a movable table arranged to receive the same when ejected therefrom, folding flanges arranged to act upon the wrapper as the table is lowered, and a slide having folding ears and arranged to move the wrapped article from the table; substantially as described.

23. The combination with continuously rotating feeding rolls, of an intermittently rotating bottomless wrapping-box to which the wrapper passes; substantially as described.

24. The combination with continuously rotating feeding rolls, of an intermittently rotating bottomless wrapping-box to which the wrapper passes, and means for forcing the wrapper and article into the box and ejecting it therefrom; substantially as described.

25. The combination with the rotatory bottomless wrapping box, of turning mechanism therefor, upper and lower movable cross-heads, and a horizontal pusher, all of which are connected by links to the same actuating mechanism; substantially as described.

26. The combination with the rotatory bottomless wrapping-box, of turning mechanism therefor, an article-feeding slide, upper and lower movable cross-heads, and a horizontal pusher, all of which are connected by links to the same actuating mechanism; substantially as described.

27. The combination with the rotatory bottomless wrapping-box, and a slide arranged to feed the article thereto, of a movable floor arranged to support the article in its movement during the rotation of the box; substantially as described.

28. The combination with the rotatory bottomless wrapping-box and a slide arranged to feed the article thereto, of a movable floor arranged to support the article in its movement during the rotation of the box, and a head arranged to force the article into the box; substantially as described.

29. The combination with the feeding rolls, of a wrapping box arranged to rotate about an intermediate axis and having nippers arranged to seize the paper, said nippers being removed from the feeding rolls a distance equal to the length of the wrapper; substantially as described.

30. The combination with the continuously moving wrapper-feeding mechanism, of means for depositing the article on the wrapper while it is being drawn forward, a wrapping box arranged to rotate about an intermediate axis, and means for forcing the article and wrapper thereinto; substantially as described.

In testimony whereof I have hereunto set my hand.

GEORGE R. WARD.

Witnesses:
W. B. CORWIN,
H. M. CORWIN.